US008121903B2

(12) United States Patent
Gould

(10) Patent No.: US 8,121,903 B2
(45) Date of Patent: Feb. 21, 2012

(54) METHOD AND SYSTEM FOR BALANCING STOCK

(76) Inventor: Alan Gould, Northbrook, IL (US)

( * ) Notice: Subject to any disclaimer, the term of this patent is extended or adjusted under 35 U.S.C. 154(b) by 0 days.

(21) Appl. No.: 12/506,657

(22) Filed: Jul. 21, 2009

(65) Prior Publication Data

US 2010/0017308 A1  Jan. 21, 2010

Related U.S. Application Data

(63) Continuation of application No. 11/441,267, filed on May 25, 2006, now abandoned.

(51) Int. Cl.
*G06Q 30/00* (2006.01)
(52) U.S. Cl. ........................ 705/26.35; 705/27.1; 705/28
(58) Field of Classification Search ...................... 705/26, 705/27, 28
See application file for complete search history.

(56) References Cited

U.S. PATENT DOCUMENTS

| | | | | |
|---|---|---|---|---|
| 5,592,375 | A * | 1/1997 | Salmon et al. ................. | 705/321 |
| 5,664,115 | A * | 9/1997 | Fraser .............................. | 705/37 |
| 5,758,328 | A * | 5/1998 | Giovannoli .................. | 705/26.4 |
| 5,842,178 | A * | 11/1998 | Giovannoli .................. | 705/26.4 |
| 5,924,802 | A * | 7/1999 | Sakurai .......................... | 400/61 |
| 5,940,807 | A * | 8/1999 | Purcell ...................... | 705/26.35 |
| 2002/0174051 | A1* | 11/2002 | Wise ............................... | 705/37 |
| 2005/0114227 | A1* | 5/2005 | Carter et al. .................... | 705/26 |

FOREIGN PATENT DOCUMENTS
WO  WO00/65505  11/2000

OTHER PUBLICATIONS

DSN Retailing Today, "B2B marketplace still seeks formula for on-line surplus sales", May 22, 2000, v39i10pg15, Proquest #53978033, 4 pgs.
Flaherty, Julie, "Those dents and demos can save you dollars", New York Times, Mar. 28, 2004, Proquest #591065621, 6 pgs.
Gentry, Connie Robbins, "The subtle clearance sale", Chain Store Age, Oct. 2001, v77i10, p. 88, OverstockB2B: Proquest #84773277, 3 pgs.
Overstock.com, "Overstock.com expands its top-selling jewelry category for Valentine's Day", PR Newswire, Feb. 2, 2001, Proquest #67526375, 3 pgs.
OverstockB2B, "New discount site targets independent retailers", Direct Marketing, Nov. 2001, v64i7pg64, Proquest #109767586, 3 pgs.
Tedeschi, Bob, "A bargain shopping web site . . . ", New York Times, Oct. 20, 2003, Proquest #425389981, 5 pgs.
Wolf, Alan, "OverstockB2B: Overstock.com adds B-2-B site", Twice, Jun. 11, 2001, v16i14pg18, Proquest #74301662, 2 pgs.

* cited by examiner

*Primary Examiner* — Robert M. Pond
(74) *Attorney, Agent, or Firm* — Ungaretti & Harris LLP

(57) ABSTRACT

A method for facilitating and enabling a retailer having original manufacture surplus inventory of a product to sell the inventory to another retailer or to the general consuming public. The method comprises use of a Web site having a first level or portion exclusively for sales between subscribers to the site, such as retailers, and a second level or portion for sales between a retailer and the general consumer. The method includes receiving information regarding the surplus inventory product and an invoice from the vendor or original manufacturer of the product. An entity associated with the Web site verifies the authenticity of the product and facilitates the sale of the products with another retailer at a first price, or with the general consumer at a second price. In certain instances, a vendor can be a subscriber for selling to other subscribers.

20 Claims, 2 Drawing Sheets

METHOD AND SYSTEM FOR BALANCING STOCK

CROSS-REFERENCE TO RELATED APPLICATIONS

This application is a continuation of and claims priority from U.S. application Ser. No. 11/441,267, which was filed on May 25, 2006, the contents of which are incorporated herein by reference.

FEDERALLY SPONSORED RESEARCH OR DEVELOPMENT

N/A.

TECHNICAL FIELD

The invention generally relates to a method and system for balancing stock between retailers using an Internet Web site; and more particularly to a method and system for anonymously selling surplus stock from a first retailer to a second retailer and from retailers to the public using the Internet Web site.

BACKGROUND OF THE INVENTION

Retailers and others face problems when a product becomes dated or non-saleable. That is, goods that a particular retailer cannot sell in a time frame that is deemed reasonable become a liability to that retailer, and tie up resources (e.g., money, display space) that could be better used for other product. To overcome this problem, retailers will attempt to return such dated goods to the vendor from which they purchased the goods, or will place the goods on sale.

In certain industries, such as the jewelry business, vendors have begun requiring retailers who desire to return product previously purchased from the vendor, to purchase other product from the vendor. For example, if a retailer desired to return a particular line of product that did not sell well for the retailer, such as a line of rings by a particular designer, the vendor would require the retailer to purchase another line of product in order for the vendor to accept the returned product line and refund the money to the retailer on that line. In fact, some vendors will require the retailer to spend more on the other product than the amount being returned. For instance, the vendor may require the retailer to spend $5 on other product for every $1 of returned product.

Such arrangements are tolerable to the retailer if the retailer has an ongoing relationship with the vendor and the retailer was going to re-order new product in any event. However, the conditions imposed on the retailer by the vendor become problematic if the retailer does not want other product from the vendor, or is not in a financial condition to spend $5 for every $1 returned.

If the retailer cannot return the product to the vendor, the retailer is forced to "mark down" the goods until they become saleable. If the retailer is still unable to sell the marked down products, the retailer must take the loss.

Vendors generally dislike taking back returned product (even at the advantageous conditions typically imposed). However, the vendor can often resell the returned merchandise to another retailer that can more readily sell such product to the consumer. The second retailer's ability to sell such product may be a result of the second retailers location, type of business or other similar factors.

The present invention is provided to solve the problems discussed above and other problems, and to provide advantages and aspects not provided by prior practices for resolving problems of this type. A full discussion of the features and advantages of the present invention is deferred to the following detailed description, which proceeds with reference to the accompanying drawings.

SUMMARY OF THE INVENTION

The present invention provides an alternative method and system for enabling a retailer to move product the retailer cannot sell or no longer wishes to sell. The method and system take advantageous of the fact that product that may not sell well for one retailer may be in higher demand by another retailer. The other retailer may have a different location, clientele, method of advertising or some other difference that allows the other retailer to sell the product.

To facilitate the movement of surplus product that one retailer cannot sell to the consuming public to another retailer, the present invention provides a Web site accessible over the Internet for selling the product. Rather than taking a complete loss or incurring the burdens associated with returning the product, a retailer can sell directly to another retailer. The Web site also provides additional services in facilitating such transactions. For example, the Web site (i.e., the entity associated with running or maintaining it) will take, steps to verify that the product being offered by a retailer is authentic. The Web site will also set prices for the product and assist in transferring the product from one party to the other.

The Web site can be split in portions or sections. One section can be dedicated to retailer-to-retailer sales as mentioned. To ensure only retailers are provided access to this section, the Web site can require an enrollment or subscriber process, and provide appropriate safeguards (e.g., a password) for obtaining access. A second portion can also be implemented for allowing retailers to sell the product directly to the general consumer. Moreover, additional sections can be provided for allowing vendors to sell to retailers and/or directly to the consuming public.

According to one aspect of the invention, a method for enabling a subscriber of a Web site portal to sell surplus new product to other subscribers is provided. The method comprises the steps of providing a Web site hosted by at least one computer in communication with a computer network. Available Internet technology for hosting and maintaining a Web site can be used to implement the Web site for the present invention. The method further includes electronically receiving surplus new product information for posting on the Web site from a first subscriber enrolled to use the Web site. The information can include, for example, a description of the surplus new product, photographs of the product, product names and identification numbers. For jewelry and watch products, such descriptive information can include, for example, carat weight, types of metals/gems or other materials incorporated into the product, etc. The information can be set up in a format provided or required by the Web site.

The Web site is also configured for electronically receiving invoice information pertaining to the surplus new product from the first subscriber. The invoice information should include an original vendor price for the surplus new product. Upon receiving the vendor price, the method includes setting a reduced price for resale of the surplus new product on the Web site to other subscribers enrolled to use the Web site. The reduced price is set at an amount below the original vendor price paid by the subscriber. This can be a predetermined amount, or an amount that may fluctuate depending on various factors (such as the subscriber's desire to unload the product). For example, the reduced price can be a set percentage under the original vendor price. This enables the selling subscriber to quickly move the product and free up almost all of the money invested, and provides the buying subscriber an incentive to obtain the product via the site rather than going to the vendor.

In order for subscribers to feel comfortable utilizing the Web site, the method further includes verifying the surplus new product is authentic. This is performed by an entity associated with maintaining the Web site, such as the entity owning and/or administering the Web site. Similarly, a third party associated with such entity could also perform such functions at the entity's direction. Examination of the invoice information may be sufficient to verify the authenticity in most cases. However, additional information can be requested from the posting subscriber. This can include receiving and reviewing any and all gem identification certificates obtained from independent agencies.

After setting the reduced price and verifying the authenticity of the product, the method includes posting the surplus new product information on the Web site for viewing by the other subscribers to the Web site and offering the surplus new product for sale on the Web site to the other subscribers at the reduced price.

The Web site is configured for electronically receiving an order for the surplus new product from one of the other subscribers. When an order is processed, the method includes receiving a shipment of the ordered surplus product from the first subscriber by the entity associated with maintaining the Web site (again, or a third party at the direction of the entity). In addition to receiving the shipment, the entity can be responsible for inspecting the ordered surplus product from the first subscriber and either forwarding the ordered surplus product to the ordering subscriber if the ordered surplus product passes inspection or returning the ordered surplus product to the first subscriber if the ordered surplus product does not pass inspection. The Web site can require a particular quality standard for the product to pass inspection.

In accordance with one embodiment, the method is utilized for jewelry and watches. In this regard, the subscribers are preferably retailers of such jewelry and watches. When inspecting such product, the method can include assessing the quality of the jewelry or watches received from the first subscriber by an entity associated with maintaining the Web site. If the quality is not up to the standard of the entity, the method can also include taking steps to place the jewelry in a condition to enable it to pass inspection. This can include polishing the jewelry, inspecting/testing and tightening stone settings if necessary, etc. For watches, the method can include inspecting/testing and lubricating the watch movement, if necessary, as well as inspecting/testing and replacing or recharging the battery, etc. The work done to bring the products up to the desired quality can be charged back to the subscriber selling the product. Alternatively, other arrangements, such as a higher subscription fee can be worked out for such services.

The Web site will provide functionality for enrolling each subscriber to the site. This can include the steps of ascertaining that each subscriber is a retailer for a similar product type and charging each subscriber a periodic fee (such as an annual or monthly fee) for use of the Web site. In addition to the periodic fee, the site can also charge a commission for sales made through the site.

According to one aspect of the invention, the Web site is divided into a first portion and a second portion. The first portion enables the first subscriber to offer for sale the surplus new product to other subscribers at the reduced price. The second portion enables the first subscriber to offer to sell the surplus new product to the general consumer.

In order to sell to the general consumer, the method can include setting a consumer retail price of the surplus new product. The consumer retail price is a predetermined amount above the vendor price paid by the subscriber. The method further includes posting the surplus product information on the second portion of the Web site and offering the surplus new product for sale, to the general consumer on the second portion of the Web site at the consumer retail price.

In accordance with another embodiment of the invention, a method is provided for facilitating and enabling a retailer to sell jewelry items to other retailers. The method utilizes a Web site hosted by at least one computer in communication with a computer network. The method further includes the steps of receiving jewelry information from a first retailer pertaining to in-stock jewelry items of the first retailer over the computer network and receiving verification information pertaining to the in-stock jewelry items from the first retailer over the computer network. In addition to the jewelry and verification information, the method includes receiving original vendor price information of the in-stock jewelry items from the first retailer over the computer network. In many instances, the price and the verification information can be in the form of a vendor invoice for the product. The method further includes calculating a reduced sales price of the jewelry items for resale to other retailers and offering the jewelry items for sale on the Web site to other retailers at the reduced sales price. The price can be based on a predetermined percentage below the original vendor price.

The method further comprises the step of receiving an offer to purchase at least a portion of the in-stock jewelry items from a second retailer over the computer network. The entity associated with maintaining the Web site can facilitate the purchase by receiving the at least a portion of the in-stock jewelry items and transferring the at least a portion of the in-stock jewelry items to the second retailer by the entity. The purchasing and selling retailers identity can remain anonymous. That is, no information pertaining to the identity of the first retailer is disclosed to the second retailer and no information pertaining to the identity of the second retailer is disclosed to the first retailer by the entity.

The entity can further facilitate the sale by accessing the quality of the at least a portion of the in-stock jewelry items by the entity prior to transferring the at least a portion of the in-stock jewelry items to the second retailer. If necessary, the entity can be responsible for polishing the at least a portion of the in-stock jewelry items (or performing other maintenance work as generally discussed above) prior to transferring the at least a portion of the in-stock jewelry items to the second retailer. The polishing or other maintenance can be performed by the entity or a third party at its direction. The first retailer can be charged for such work.

The method can further include the entity guaranteeing the authenticity of the jewelry items to the second retailer. Accordingly, the verifying step and the assessing step take on greater importance to the entity.

According to one aspect of the embodiment, the method can include dividing the Web site into a retailer-to-retailer portion and a retailer-to-general consumer portion. Preferably, only retailers are permitted access to the retailer-to-retailer portion of the Web site. For the retailer-to-general consumer portion of the Web site, the method includes calculating a general consumer price of the jewelry items and offering the jewelry items to general consumers at the general consumer price on the retailer-to-general consumer portion of the Web site.

According to yet a further embodiment of the invention, a method for enabling a retailer to move in-stock items utilizing a multi-level Web site is provided. The method comprises the step of providing a Web site having a first retailer-to-retailer level and a second retailer-to-consumer level. The method further includes receiving in-stock items descriptive information from a first retailer over the computer network and receiving original manufacturer price information of the in-stock items.

Based on the information received, the Web site is able to calculate a first price of the in-stock items for sale to other retailers on the first retailer-to-retailer level of the Web site where the first price can be a predetermined percentage below a original manufacturer price of the in-stock items and, calculate a second price of the in-stock items for sale to consumers on the second retailer-to-consumer level of the Web site where the second price can be a predetermined percentage above the original manufacturer price of the in-stock items. The in-stock items can then be offered for sale on the first level of the Web site at the first price; and, offered for sale on the second level at the second price.

This method can also include verifying the authenticity of the in-stock items by an entity associated with maintaining the Web site. This can include receiving invoice information pertaining to the in-stock items from the first retailer over the computer network. In one preferred embodiment of the invention, the in-stock items are designer name brand jewelry items or watches.

The method can include providing a third vendor-to-retailer level of the Web site. Thus vendors can become subscribers and post vendor product information onto the third level for sale of products directly to retailers.

The invention also includes a system (i.e., computers, databases, wired and wireless network connections, etc.) and software for implementing the functions of the Web site discussed herein. Additionally, the invention also includes a graphical user interface to facilitate such implementation.

The economy of scales associated with the present invention will significantly benefit the subscribers to the Web site. Retailers (and in some cases vendors) enrolling with the Web site will be able to quickly and easily reach a plurality of other retailers. This allows advertising and other costs associated with maintaining the site to be spread throughout the subscriber group. This is vastly more efficient than each retailer maintaining its own site.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
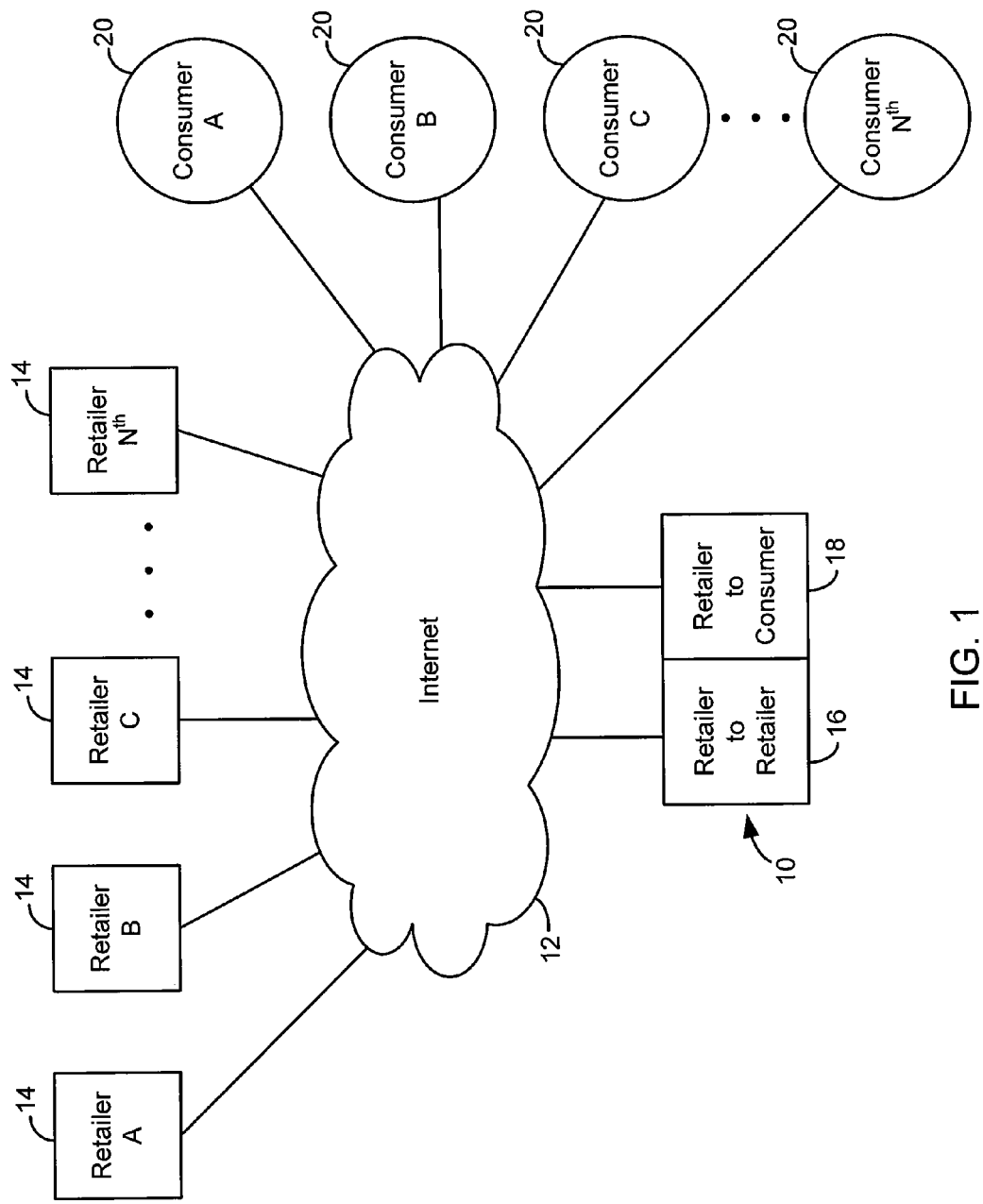
FIG. 1 is a block diagram of a Web site for use by retailers and consumers in accordance with aspects of the present invention; and, FIG. 2 is a block diagram of another embodiment of a Web site for use by retailers, consumer and vendors in accordance with aspects of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention enables a retailer to easily move product or stock that the retailer cannot sell in a timely manner to other retailers or to the general public. This frees up money for the retailer to invest in other product that may sell better for that retailer. In one example described in detail herein, the invention is particularly useful for balancing stock between retailers in the jewelry industry. However, other industries can implement the system and method disclosed.

In the jewelry industry, retailers are often required to purchase certain lines of product (e.g., a particular named designer's line of rings, bracelets or necklaces) in bulk amounts from a vendor. For example, the retailer may only be able to purchase product in minimums of $25,000 or $50,000 or more.

For product that sells well, this does not become a problem. However, if the product doesn't sell, the retailer is left with stock that it cannot move, and has tied up resources in such stock that cannot be used for other product. This is a problem even when there is no requirement to buy in bulk.

As described above, in the past, retailers have attempted to return product that doesn't sell to the vendor the retailer originally purchased the product from. However, vendors in the jewelry business will often require the retailer to purchase other product from the vendor (e.g., different styles or other designer's jewelry) in order for the vendor to accept any returned merchandise. Moreover, the vendor may require the retailer to purchase more than what is being returned. For example, the vendor may require the retailer to spend $5 on new product for every $1 of returned product.

In some instances, returning the product to the vendor under the conditions imposed by the vendor is not practical for the retailer. The retailer may not want or like any of the other product lines available through the vendor, or may not have the resources to purchase five times the amount being returned. Accordingly, the retailer will have to look elsewhere to unload the product.

The system described provides several avenues for the retailer to get rid of product that does not sell well for the retailer without having to incur the hardship of dealing with the vendor. The system accomplishes this by removing the vendor from the equation.

It has been found that sometimes a product that doesn't sell well at one location for a first retailer may be in high demand at other locations by other retailers. The present invention takes advantage of such demand to the benefit of both the selling retailer and the purchasing retailer.

Figure 2:
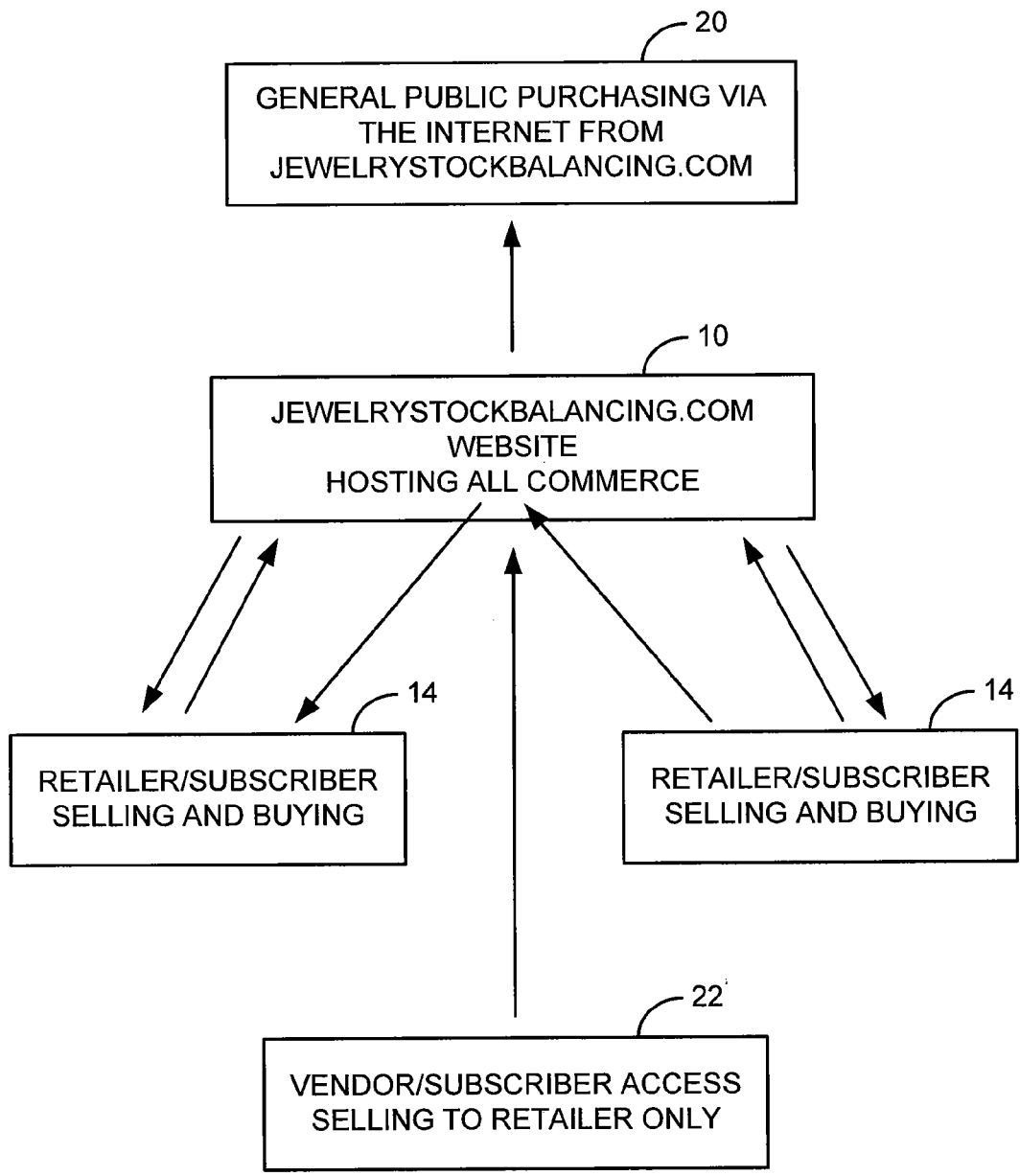

Referring to FIGS. 1 and 2, the method and system of the present invention includes a Web site 10 that is hosted by at least one computer (such as a server). The computer is in communication with a computer network, such as the Internet 12. The Web site 10 acts as a portal to enable retailers of unsold (i.e., surplus) stock (i.e., product) to sell the stock to other retailers or the general public. The Web site 10 is reachable by known browser software and technology.

The present method provides two primary avenues for the retailer to move or sell the surplus stock, and thus free up the retailer's resources for new product. The first way involves the retailer selling the surplus stock to other retailers of similar product. The second way involves the retailer selling the surplus stock to the general public.

Under either path, one or more retailers 14 (e.g., Retailer A—Nth in FIG. 1) must first sign up or enroll with the Web site 10 as subscribers. Each subscriber can be charged a periodic fee, such as an annual or monthly fee, by the entity associated with maintaining the Web site 10 for use of the services provided via the Web site 10. Alternatively, or in addition to the periodic fee, the subscribers may also be charged a fee or a commission for product that is sold through the site 10.

The Web site 10 is divided into two primary portions or sections 16 and 18 (as shown in FIG. 1). The first portion 16 of the Web site 10 is for retailer-to-retailer transactions, and the second portion is for retailer-to-consumer transactions (i.e., the general public). As discussed below, a modified first portion can be implemented wherein a vendor can act as a subscriber to sell and/or advertise product directly to other retailer subscribers. Alternatively, a separate vendor to retailer portion of the site 10 can be created for such transaction.

The subscription to the Web site 10 allows the retailer 14 to post information relating to the surplus inventory or product the retailer 14 wants to sell on the Web site 10. To accomplish this, a retailer 14 that has been enrolled as a subscriber, logs onto the Web site 10 and navigates to a portion of the Web site 10 for sending information relating to any surplus product in the retailer's possession. The log on procedure can include typical safeguards, such as requiring a password or other identification information of the subscriber.

A variety of information can be submitted relating to the surplus inventory. In this regard, the information relating to the surplus inventory can include the name of the product (and for jewelry, the designer's name); a product description; photographs or drawings of the product; original invoice price, current price offered to other subscribers or to general public; catalog or item numbers; etc.

The Web site 10 is set up for electronically receiving the surplus product information for posting on the Web site from the subscriber. This information may be reviewed and/or formatted by the entity associated with maintaining the Web site (e.g., the owner of the Web site or a designated administrator of the Web site) prior to posting on the site for others to see. This will ensure that the postings are in compliance with any rules or regulations of the Web site, and that product information from different retailers conform to the preferred format for the site.

The Web site 10 is also set up for electronically receiving information pertaining to the surplus new product, such as a verifiable original invoice from the vendor. The invoice information should include the price paid for the product by the subscriber. This information is used for setting a price of the product on the Web site 10. It can also be used for verifying the authenticity of the product by the entity associated with maintaining the Web site 10.

A first price is calculated for posting the product on the retailer-to-retailer portion 16 of the Web site 10. In this regard, the Web site 10 includes the functionality for calculating or setting a reduced price for resale of the surplus product on the Web site 10 to other subscribers 14 enrolled to use the Web site 10. For other subscribers 14, the price is reduced a predetermined amount below the original vendor price, such as 5% below.

Once the reduced price is determined, the surplus product is posted on the retailer-to-retailer portion 16 of the Web site 10 wherein it will be offered for sale at the reduced price to other subscribers 14. Only subscribers 14 will be permitted access to this portion 16 of the Web site.

A second—consumer—price is calculated for posting the product on the retailer-to-consumer portion 18 of the Web site 10. The consumer price is a predetermined amount above the vender price. Preferably, for example, the consumer price is 20% above the vendor price to the retailer.

The surplus product is then offered for sale to the general public on the retailer-to-consumer portion 18 of the Web site 10 at the consumer price. Each consumer 20 can, access this portion 18 of the Web site 10 through the Internet 12 and purchase product.

Unlike other on-line Web sites that sell new product, the system and method of the present invention requires certain unique actions by the entity associated with maintaining the Web site 10. That is, in addition to calculating the appropriate prices and posting the surplus inventory information on the Web site 10, the entity associated with maintaining the Web site is also responsible for other activities relating to the sale of the surplus inventory. One such activity is verifying the authenticity of the product being offered by the retailer. This may include examining the original invoice information, or other further research necessary to ensure the product is authentic.

After another retailer or a consumer agrees to purchase one or more items from a retailer, the entity will receive the product from the retailer, and will assess the quality of the product before shipping to it to the purchaser. If the product is tarnished, the entity can polish (or arrange to have a third party do so) the product until it meets the quality criteria established by the entity, before shipping it to the buyer.

Importantly, the identity of the subscribers is kept confidential from the other subscribers and the public. To overcome any problems associated with keeping this information confidential, the entity maintaining the Web site and/or the owner of the Web site 10 can provide a guarantee that the product being purchased is authentic. Further, if the product is rejected by either the purchasing subscriber or consumer, the product can be returned to the retailer (via the entity) at the retailer's expense.

Referring to FIG. 2, another aspect of the invention is shown. In addition to allowing the retailers to sell to each other and to the public, the Web site 10 can also allow vendors 22 to become subscribers, and allow such vendors access to sell product to other subscribers. In the embodiment shown in FIG. 2, the Web site 10 has an URL of jewelrystockbalancing.com.

The vendor can provide the Web site 10 with information pertaining to product it wants to place on the site. The vendor product information can be posted and the product offered for sale on the site. A vendor price can be calculated for selling the product to the retailers. Preferably, this price is below what the retailers would normally pay if they went to the vendor directly.

In accordance with another aspect of the invention, the method can include the entity associated with the maintaining the Web site 10 (or its representative) taking a more active role in selling product. This can occur when too much of the same or similar product is being posted on the Web site 10 by multiple retailers 14. The entity can obtain permission by all or most of the retailers 14 to bundle the product together and take steps for selling it to a third party in a single transaction. This can be done at a further reduced price.

A large number of requirements can be implemented in the business model described with respect to use and functionality of the Web site and entity discussed above. For example, the site can require that all retailers be in the same type of business (e.g., jewelry). To ensure this, the retailers may be required to provide verification of by means of a store lease, business license, resale certificate in residing state of business, etc.

When purchasing product from the site, the entity associated with maintaining the site can provide an invoice to the purchasing retailer or consumer. This invoice can act as an original invoice for subsequent postings of the product (i.e., the verification has already been performed in the original sale to the second subscriber or consumer).

The site can require that all merchandise be under warranty by the original retailer in terms of the factory warranty of any product, which carries such a warranty. Similarly, the site can require retailers to guaranty the condition of product or be charged to properly recondition to like new saleable condition.

Additionally, retailers can be required to provide any and all certificates which apply to the product they are trying to sell.

The site can require retailers to indemnify and hold harmless the site for any and all infractions of vendor agreements signed between retailer and original vendor.

Terms for shipping and payment can also be spelled out. For example, all merchandise must be available for shipment within an agreed upon time yet to be determined. Also, purchasing retailers agree to pay for product prior to shipping, and selling retailers agree to take return of product for quality failure at their cost.

The site can also require all subscribers to monitor the site and the transactions taking place on the site. This requirement makes the site an attractive location for advertising by vendors and other that wish to reach the subscribers of the site.

According to one embodiment of the invention, in operation the subscribers will give the site a user's name upon enrollment. This can not be the store's name or other identifying descriptor in order to keep all subscribers anonymous. The site will then assign a password to the subscriber to use the site. Subscribers must log on to the Web site under their user name and password to either buy or sell product. In this regard, subscribers will have a separate access to the site from the general public.

If a subscriber is trying to sell product on the site 10, they will have to comply with guidelines for placing product for sale. Some of these guidelines are, but not limited to the following:
  A. All pictures of product must be at a certain level of pixel resolution and size.
  B. All pictures must be made on the "background" provided by the site.
  C. All descriptions of the product must be provided from the original invoice. This invoice will be scanned to go with product on the site; however the name of company selling and invoice number will be hidden from view. This includes, but is not limited to the following:
    1. Model/style number if applicable and original manufacturer.
    2. Number and type of stones and carat weights with grading.—This may have to be reevaluated by the entity managing the site.
    3. Karating an overall weight of the piece (for jewelry items).
    4. Dimensions of the piece.
    5. Any and all relevant information in terms of certification as well as warranty that travels with the product.
    6. Any and all original packaging the product was received in by the subscriber (e.g., a watch box, or in the case of crystal, the padded shipping box with original vendors box).

Upon completion, the site will verify all of the above. If an infraction occurs prior to posting the product to the site, subscribers will be sent an e-mail or phone call informing them of the error and requesting that they make appropriate changes. Once all obligations are met, the site will then post product for sale. In other words, the site will make sure everything is correct prior to web transmission of information to other subscribers 14 and the general public.

Aspects of the process described above will be made through the Web site 10. The means by which all obligations are covered is through usual "box" fill in as most websites have. Pull down menus can be provided for commonly used information. All necessary boxes will have an asterisk, or be highlighted, for the user to fill in appropriately.

Typical website procedures for purchasing product can be implemented for use on the present site 10. Additionally, subscribers can also maintain accounts with the site 10 that can be debited or credited as appropriate. In this regard, payment will be made at the time of purchase. Either the subscriber provides a credit card number or the site will have access to the subscriber account with the site.

Product will be made available and searchable in many ways on the site 10. For example, each level or portion of the site can be divided into various categories for product to purchase, such as earrings and rings, necklaces, etc. The site 10 will also have product for sale by manufacturer as well. All products will be able to be purchased from various cross references to support various styles of shopping.

Two shipping charges will be associated with purchased product. The first is from the subscriber selling the product. This is for shipment to managing entity for verification. The second is from the managing entity to the buying subscriber. All of the shipping costs, including proper insurance are to be split between seller and buyer. The managing entity will negotiate a rate plan with a major shipping company prior to beginning business. The selling subscriber will receive from the site a shipping label via the Internet to ship product to the managing entity The selling subscriber must make product available for shipment within a set time frame (e.g., 48 hours). The site will notify the selling subscriber upon receiving a buy order on the site.

The purchasing subscriber will have a set time (e.g., 48 hours) to notify the site of a rejection of product. The site will provide guidelines outlining what the grounds are for rejection of product to all subscribers.

Requests for merchandise made on the site, by either subscriber or consumer, for a particular product will be filled by the first responding vendor. No accommodations will be made for other subscribers with the same product who do not respond in a timely fashion. The site will also function as a "find a piece" site for purchase. Requests can be "written" in a box describing the piece. Description can be in the form of vendors name and style/model number. A description can also be in generic terms. For example, a request can be made for a strand of 18" pearls in size 7×6.5 mm. Any and all request will be given to subscribers and responses filtered to the party making the request.

The entity managing the site 10 will also perform other functions. For example, the entity will be responsible for marketing and advertising the site to the retailers and to the general public. Additionally, the entity can be responsible for purchasing an insurance policy covering all products while in possession of the managing entity, and insuring all packages in transit. The managing entity may also employ a Graduate Gemologist to verify product.

While the specific embodiments have been illustrated and described, numerous modifications come to mind without significantly departing from the spirit of the invention, and the scope of protection is only limited by the scope of the accompanying claims.

What is claimed is:

1. A method for enabling a retailer subscriber of a Web site portal to sell surplus new product to other retailer subscribers and the general consumer, the method comprising the steps of:
   providing a Web site hosted by at least one computer in communication with a computer network;
   providing a retailer subscriber to retailer subscriber section of the Web site accessible only to retailer subscribers;
   electronically receiving surplus new product information for posting on the retailer subscriber to retailer subscriber section of the Web site from a first retailer subscriber enrolled to use the retailer subscriber to retailer subscriber section of the Web site;
   electronically receiving invoice information pertaining to the surplus new product from the first retailer subscriber, wherein the invoice information includes an original vendor price paid by the first subscriber for the surplus new product;
   electronically receiving verification information pertaining to the surplus new product from the first retailer over the computer network;
   verifying the surplus new product is authentic, based on the received verification information;
   electronically calculating a reduced price for resale of the surplus new product on the Web site to other retailer subscribers enrolled to use the Web site, the reduced price being an amount below the original vendor price to the first retailer subscriber;
   posting the surplus new product information on the retailer subscriber to retailer subscriber section of the Web site following the steps of electronically receiving invoice information and verification information for viewing by the other retailer subscribers to the Web site;
   offering the surplus new product for sale on the Web site to the other retailer subscribers at the reduced price, wherein the product is sold directly from the first retailer subscriber to a second retailer subscriber through the Web site.

2. The method of claim 1 further comprising the steps of:
   electronically receiving an order for the surplus new product from the second retailer subscriber;
   receiving a shipment of the ordered surplus product from the first retailer subscriber;
   inspecting the ordered surplus product from the first retailer subscriber by an entity associated with maintaining the Web site; and,
   one of forwarding the ordered surplus product to the second retailer subscriber if the ordered surplus product passes inspection and returning the ordered surplus product to the first retailer subscriber if the ordered surplus product does not pass inspection.

3. The method of claim 2 wherein each retailer subscriber is a retailer for at least one of jewelry and watches.

4. The method of claim 3 wherein the step of inspecting the ordered surplus product from the first retailer subscriber includes:
   assessing the quality of one of jewelry and watches received from the first retailer subscriber by the entity associated with maintaining the Web site.

5. The method of claim 4 further comprising the step of:
   performing maintenance on the jewelry until it is able to pass inspection the entity.

6. The method of claim 1 further comprising the steps of:
   enrolling each retailer subscriber to the Web site wherein the enrolling step includes for each retailer subscriber:
   ascertaining that each retailer subscriber is a retailer for a similar product type; and,
   charging each retailer subscriber a fee for use of the Web site.

7. The method of claim 1 further comprising the steps of:
   providing a retailer to general consumer section to the Web site that enables the first retailer subscriber to offer to sell the surplus new product to the general consumer.

8. The method of claim 7 further comprising the steps of:
   electronically calculating a consumer retail price of the surplus new product wherein the consumer retail price is an amount above the vendor price;
   posting the surplus product information on the retailer to general consumer section of the Web site; and
   offering the surplus new product for sale to the general consumer on the retailer to general consumer section of the Web site at the consumer retail price.

9. The method of claim 8 further comprising the step of:
   paying an owner of the Web site a fee for each sale of the surplus new product by the first retailer subscriber using the Web site.

10. A method for facilitating and enabling a retailer to sell jewelry items to other retailers, the method comprising the steps of:
    providing a Web site hosted by at least one computer in communication with a computer network;
    receiving jewelry information from a first retailer pertaining to in-stock jewelry items of the first retailer over the computer network;
    electronically requesting verification information pertaining to the in-stock jewelry items from the first retailer over the computer network;
    electronically receiving verification information pertaining to the in-stock jewelry items from the first retailer over the computer network;
    verifying the in-stock jewelry items are authentic, based on the received verification information;
    electronically receiving from the first retailer original vendor price information paid by the first retailer for the in-stock jewelry items over the computer network;
    electronically calculating a reduced sales price of the jewelry items for resale to other retailers below the original vendor price to the first retailer; and
    offering the jewelry items for sale on the Web site to other retailers at the reduced sales price following the steps of electronically receiving verification information and vendor price information, wherein the jewelry items are sold directly from the first retailer to a second retailer through the Web site.

11. The method of claim 10 further comprising the steps of:
    electronically receiving an offer to purchase at least a portion of the in-stock jewelry items from a second retailer over the computer network; and,
    electronically receiving the at least a portion of the in-stock jewelry items by an entity associated with maintaining the Web site;
    transferring the at least a portion of the in-stock jewelry items to the second retailer by the entity wherein no information pertaining to the identity of the first retailer is disclosed to the second retailer and no information pertaining to the identity of the second retailer is disclosed to the first retailer by the entity.

12. The method of claim 11 further comprising the step of:
assessing the quality of the at least a portion of the in-stock jewelry items by the entity prior to transferring the at least a portion of the in-stock jewelry items to the second retailer.

13. The method of claim 12 further comprising the step of:
performing maintenance on the at least a portion of the in-stock jewelry items by the entity prior to transferring the at least a portion of the in-stock jewelry items to the second retailer.

14. The method of claim 13 further comprising the step of:
charging the first retailer for the performing maintenance on the at least a portion of the in-stock jewelry items.

15. The method of claim 10 further comprising the step of:
guaranteeing the authenticity of the jewelry items to the second retailer by the entity.

16. The method of claim 10 further comprising the steps of:
dividing the Web site into a retailer-to-retailer portion and a retailer-to-general consumer portion wherein only retailers are permitted access to the retailer-to-retailer portion of the Web site;
calculating a general consumer price of the jewelry items; and,
offering the jewelry items to general consumers at the general consumer price on the retailer-to-general consumer portion of the Web site.

17. A method for enabling a retailer to move in-stock items utilizing a multi-level Web site, the method comprising the steps of:
providing a Web site hosted by at least one computer in communication with a computer network, the Web site having a first retailer-to-retailer level and a second retailer-to-consumer level;
receiving in-stock items descriptive information from a first retailer over the computer network;
electronically receiving original manufacturer price information paid by the first retailer for the in-stock items;
electronically receiving verification information pertaining to the in-stock items;
verifying the in-stock items are authentic, based on the received verification information;
electronically calculating a first price of the in-stock items for sale to other retailers on the first retailer-to-retailer level of the Web site, the first price being a percentage below the original manufacturer price of the in-stock items paid by the first retailer;
calculating a second price of the in-stock items for sale to consumers on the second retailer-to-consumer level of the Web site, the second price being a percentage above the original manufacturer price of the in-stock items;
offering the in-stock items for sale on the first level of the Web site at the first price following the steps of receiving the price information and the verification information, wherein the first retailer can sell the in-stock items directly to a second retailer through the Web site; and
offering the in-stock items for sale on the second level of the Web site at the second price following the steps of receiving the price information and the verification information, wherein the first retailer sells the in-stock items directly to a consumer through the Web site.

18. The method of claim 17 further comprising the step of:
verifying the authenticity of the in-stock items by an entity associated with maintaining the Web site.

19. The method of claim 18 further comprising the step of:
receiving invoice information pertaining to the in-stock items from the first retailer over the computer network.

20. The method of claim 18 further comprising the steps of:
providing a third vendor-to-retailer level of the Web site; and,
posting vendor product information onto the third level for sale to retailers.

* * * * *